(12) United States Patent
Laurenti

(10) Patent No.: US 6,502,152 B1
(45) Date of Patent: Dec. 31, 2002

(54) DUAL INTERRUPT VECTOR MAPPING

(75) Inventor: Gilbert Laurenti, Saint Paul de Vence (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/410,743

(22) Filed: Oct. 1, 1999

(30) Foreign Application Priority Data

Mar. 8, 1999 (EP) .......................................... 99400550

(51) Int. Cl.[7] .............................................. G06F 13/26
(52) U.S. Cl. ...................................... 710/264; 710/265
(58) Field of Search .................................. 710/260–269

(56) References Cited

U.S. PATENT DOCUMENTS

| | | | | |
|---|---|---|---|---|
| 5,283,880 A | * | 2/1994 | Marcias-Garza | 711/118 |
| 5,394,544 A | * | 2/1995 | Motoyama et al. | 714/31 |
| 5,812,760 A | * | 9/1998 | Mendenhall et al. | 348/467 |

FOREIGN PATENT DOCUMENTS

EP           0992902 A2    * 12/2000

* cited by examiner

*Primary Examiner*—Rupal Dharia
(74) *Attorney, Agent, or Firm*—Gerald E. Laws; W. James Brady, III; Frederick J. Telecky, Jr.

(57) ABSTRACT

A processor (100) is provided that is a programmable digital signal processor (DSP) with variable instruction length, offering both high code density and easy programming. Architecture and instruction set are optimized for low power consumption and high efficiency execution of DSP algorithms, such as for wireless telephones, as well as pure control tasks. Two sets of interrupt vectors are maintained. Interrupts vectors pertaining to interrupts originated by one set of interrupt sources (820, 821, 822) are stored in a DSP interrupt vector table (850) located in a memory circuit 801 that is private to the DSP. Interrupt vectors pertaining to interrupts originated by a host processor (810) are stored in a Host interrupt vector table (851) located in a dual ported communication memory circuit (802). The DSP executes interrupt service routines to service all of the interrupts, but the host can change the interrupt vectors for host initiated interrupts.

18 Claims, 8 Drawing Sheets

DUAL INTERRUPT VECTOR MAPPING

This application claims priority to S.N. 99400550.2, filed in Europe on Mar. 8, 1999 (TI-27764EU) and S.N. 98402455.4, filed in Europe on Oct. 6, 1998 (TI-28433EU).

FIELD OF THE INVENTION

The present invention relates to digital microprocessors, and more particularly to interrupt mechanisms for digital microprocessors.

BACKGROUND OF THE INVENTION

Microprocessors are general purpose processors which require high instruction throughputs in order to execute software running thereon, and can have a wide range of processing requirements depending on the particular software applications involved. An interrupt response mechanism in a microprocessor typically includes an interrupt vector table for identifying the location of interrupt service routines.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as mobile telecommunications applications, it is desirable to provide ever increasing DSP performance while keeping power consumption as low as possible.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a microprocessor that is a programmable digital signal processor (DSP), offering both high code density and easy programming. Architecture and instruction set are optimized for low power consumption and high efficiency execution of DSP algorithms, such as for wireless telephones, as well as pure control tasks. The microprocessor is operable to respond to an interrupt request from a plurality of sources. The microprocessor has means for receiving a plurality of interrupt requests from the plurality of sources, means for retrieving a first interrupt vector from a first memory circuit in response to a first interrupt request from a first source selected from the plurality of sources. The microprocessor also has means for retrieving a second interrupt vector from a second memory circuit in response to a second interrupt request from a second source selected from the plurality of sources; wherein the second memory circuit is distinct from the first memory circuit. The microprocessor has means for executing a first interrupt service routine from a plurality of interrupt service routines in response to the first interrupt vector and a second interrupt service routine from the plurality of interrupt service routines in response to the second interrupt vector.

In accordance with another aspect of the present invention, there is a first memory circuit connected to the microprocessor operable to store a value for the first interrupt vector, a second memory circuit connected to the microprocessor operable to store a value for the second interrupt vector; and a host processor interface connected to the second memory circuit, wherein the host processor interface is operable to provide the second interrupt request.

In accordance with another aspect of the present invention, there is a host processor connected to the host processor interface, such that the host processor interface is operable to cause a different value to be stored in the second memory for the second interrupt vector in response to the host processor, and such that the host processor interface is operable to provide the second interrupt request in response to the host processor.

In accordance with another aspect of the present invention, a method of operating a digital system is provided. A microprocessor is operable to respond to an interrupt request from a plurality of sources by performing the following steps: receiving a plurality of interrupt requests from the plurality of sources; determining an interrupt number of a highest priority interrupt request of the plurality of interrupt requests; retrieving a first interrupt vector from a first memory circuit in response to a first interrupt request from a first source selected from the plurality of sources; executing a first interrupt service routine from a plurality of interrupt service routines in response to the first interrupt vector; retrieving a second interrupt vector from a second memory circuit in response to a second interrupt request from a second source selected from the plurality of sources; wherein the second memory circuit is distinct from the first memory circuit; and executing a second interrupt service routine from the plurality of interrupt service routines in response to the second interrupt vector.

In accordance with another aspect of the present invention, the address of the first interrupt vector in the first memory circuit is formed by combining a value stored in a first pointer register and the interrupt number if the value of the interrupt number is within a first range, the address of the second interrupt vector in the second memory circuit is formed by combining a value stored in a second pointer register and the interrupt number if the value of the interrupt number is within a second range.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which.

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

The basic architecture of an example of a processor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Figure 1:
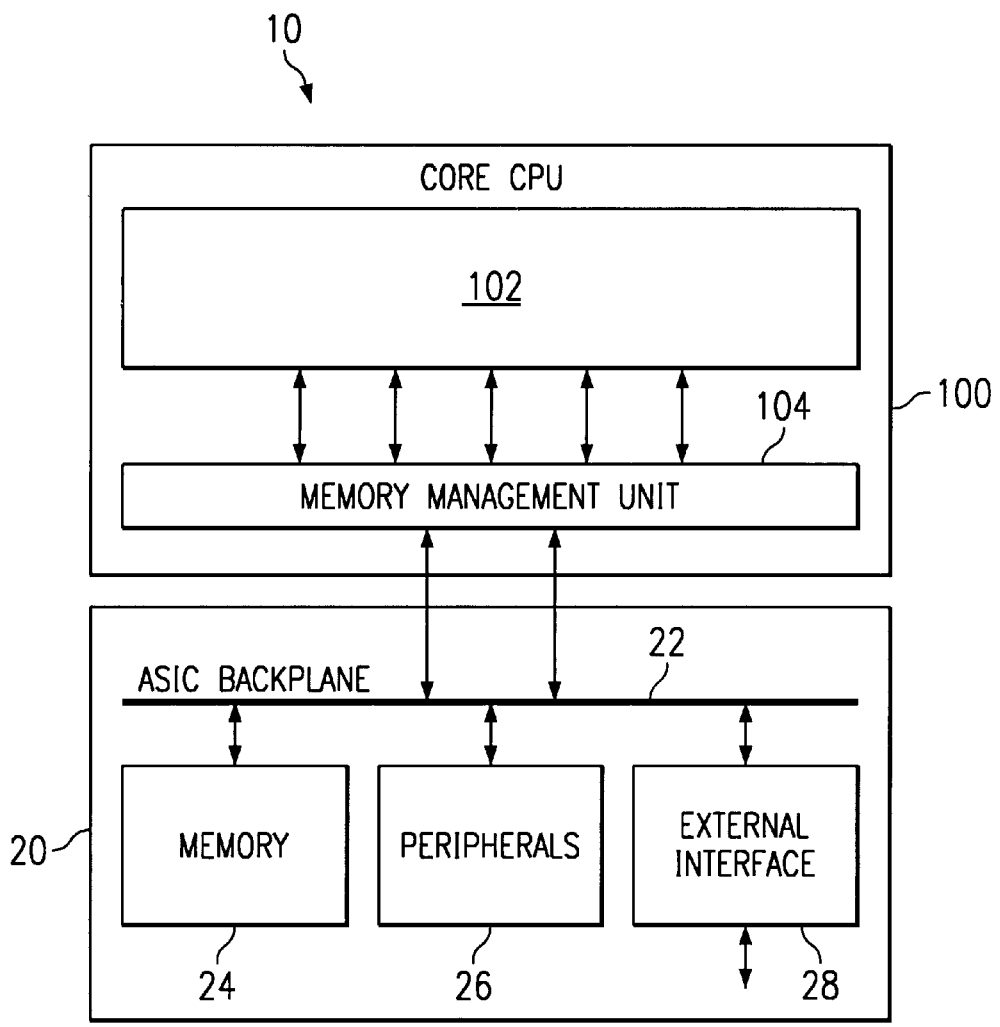
FIG. 1 is a schematic block diagram of a digital system which includes a microprocessor in accordance with an embodiment of the invention.

FIG. 1 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 1 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 (TI-28433), which is incorporated herein by reference.

As shown in FIG. 1, processor 100 forms a central processing unit (CPU) with a processor core 102 and a memory interface unit 104 for interfacing the processor core 102 with memory units external to the processor core 102.

Processor backplane 20 comprises a backplane bus 22, to which the memory management unit 104 of the processor is connected. Also connected to the backplane bus 22 is an instruction memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
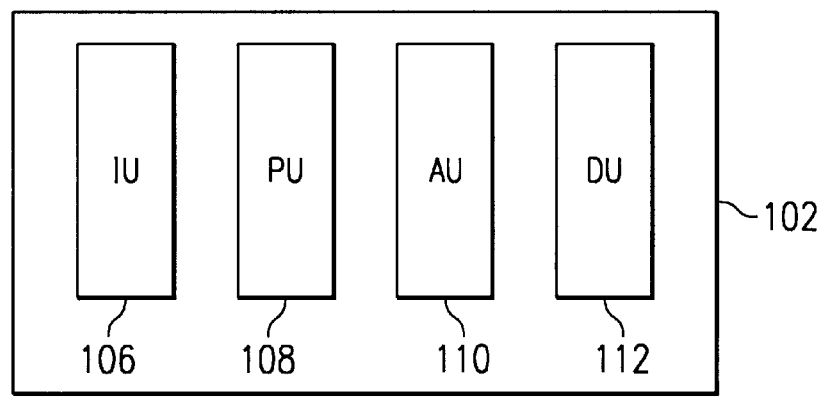
FIG. 2 is a schematic diagram of the processor core of FIG. 1.

FIG. 2 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
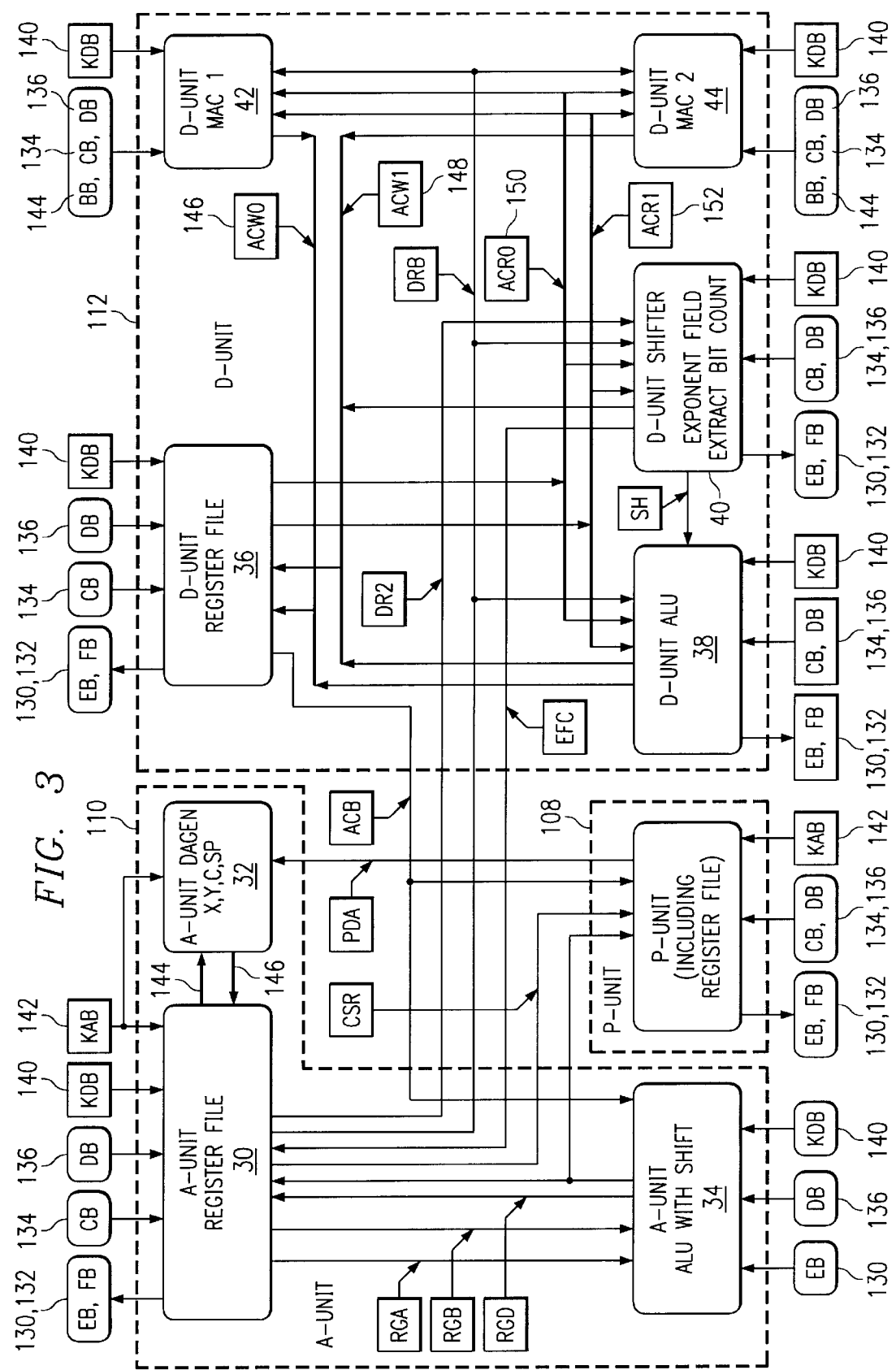
FIG. 3 is a more detailed schematic block diagram of various execution units of the processor core.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to buses (EB, FB, CB, DB and KDB) 130, 132, 134, 136 and 140, and the MAC units 42 and 44 are coupled to the buses (CB, DB, KDB) 134, 136, 140 and Data Read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to sub-units of the A Unit 108 via various buses labeled EFC, DRB, DR2 and ACB.

Figure 4:
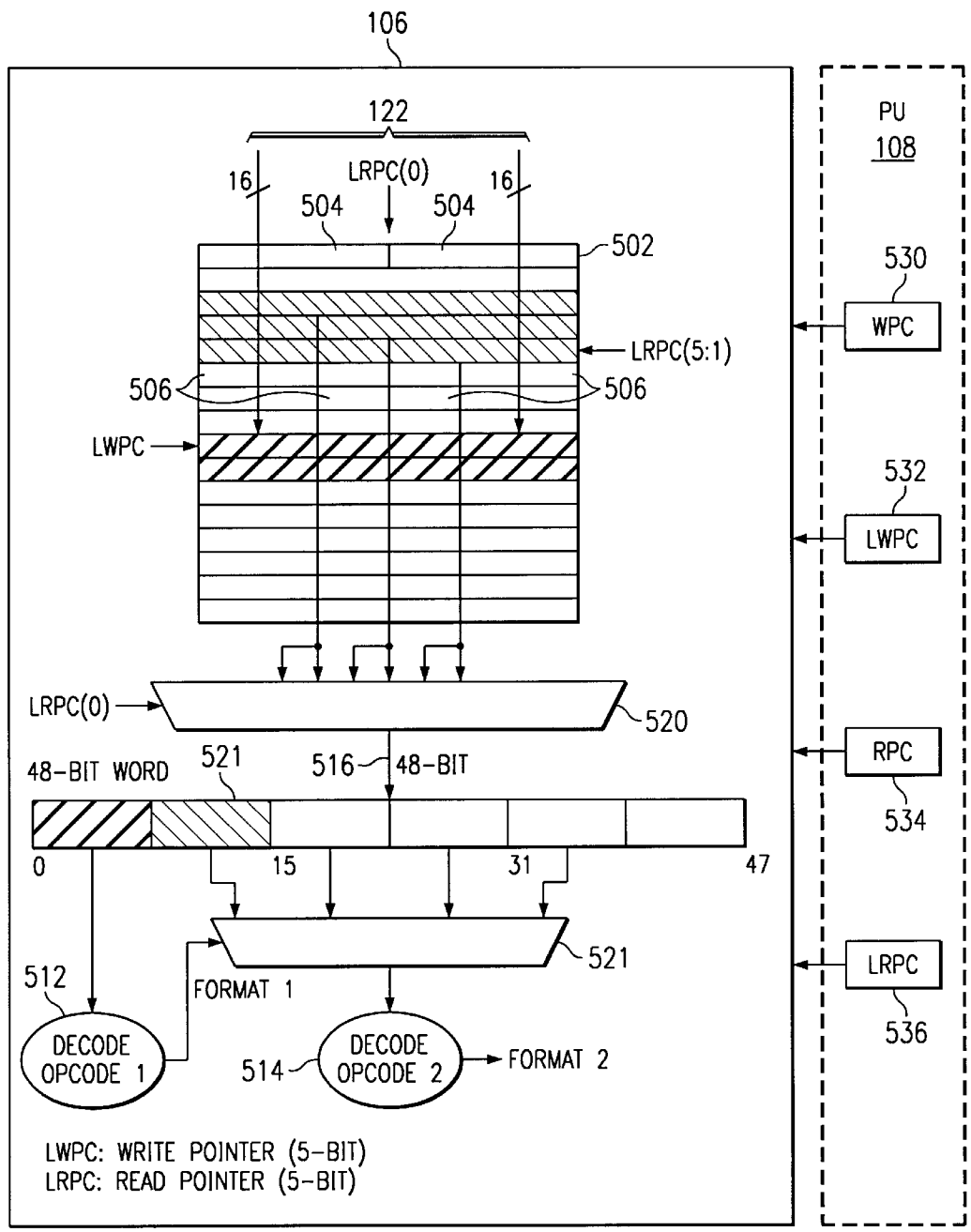
FIG. 4 is a schematic diagram of an instruction buffer queue and an instruction decoder of the processor.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexers 520 and 521. It will be apparent to a person of ordinary skill in the art that the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle for parallel execution. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Two instructions can be put in parallel if one of the two instructions is provided with a parallel enable bit. The hardware support for such type of parallelism is called the parallel enable mechanism. Likewise, two instructions can be put in parallel if both of the instructions make single data memory accesses (Smem, or dbl(lmem)) in indirect mode. The hardware support for such type of parallelism is called the soft dual mechanism.

Figure 5:
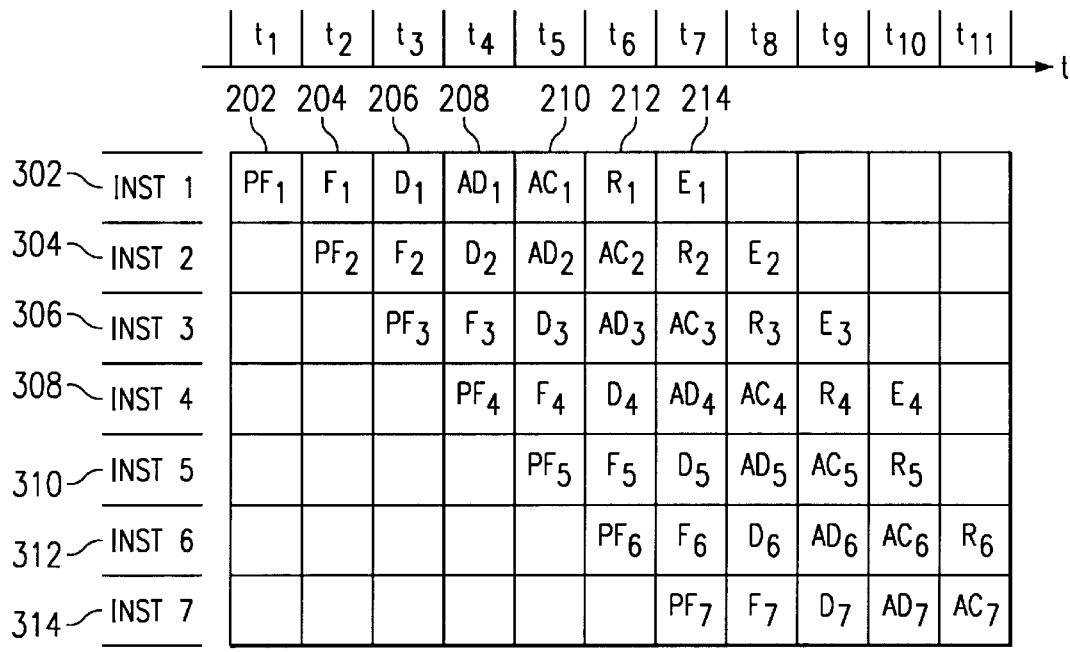
FIG. 5 is a schematic representation of the processor core for explaining the operation of the pipeline of the processor.

Processor core 102 executes instructions through a 7 stage pipeline, the respective stages of which will now be described with reference to Table 1 and to FIG. 5. The processor instructions are executed through a seven stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1

Processor Pipeline Operation for a
Single Cycle Instruction With No Memory Wait States

| Pipeline stage | | Description. |
| --- | --- | --- |
| P0 | Pre-Fetch | Address program memory via the program address bus PAB. |
| P1 | Fetch | Read program memory through the program bus PB. |
| | | Fill instruction buffer queue with the 4 bytes fetched in program memory. |
| P2 | Decode | Read instruction buffer queue (6 bytes) |
| | | Decode instruction pair or single instruction. |
| | | Dispatch instructions on Program Flow Unit (PU), Address Data Flow Unit (AU), and Data Computation Unit (DU). |

TABLE 1-continued

Processor Pipeline Operation for a
Single Cycle Instruction With No Memory Wait States

| Pipeline stage | | Description. |
|---|---|---|
| P3 | Address | Data address computation performed in the 3 address generators located in AU:<br>　Pre-computation of address to be generated in:<br>　　direct SP/DP relative addressing mode:<br>　　indirect addressing mode via pointer registers.<br>　Post-computation on pointer registers in:<br>　　indirect addressing mode via pointer registers.<br>　Program address computation for PC relative branching instructions: goto, call, switch. |
| P4 | Access | Read memory operand address generation on BAB, CAB, DAB buses.<br>Read memory operand on CB bus (Ymem operand). |
| P5 | Read | Read memory operand on DB (Smem, Xmem operand), on CB and DB buses (Lmem operand), on BB (coeff operand)<br>Write memory operand address generation on EAB and FAB buses. |
| P6 | Execute | Execute phase of data processing instructions executed in A unit and D unit.<br>Write on FB bus (Ymem operand).<br>Write Memory operand on EB (Smem, Xmem operand), on EB and FB buses (Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It also makes the code translation from a prior generation processor to a latter generation processor much easier.

A pipeline protection basic rule used in processor 100 is as follows: if a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of 7 instructions may be processed simultaneously. For all 7 instructions 302–314, FIG. 5 shows them all under process in time period $T_7$. Such a structure adds a form of parallelism to the processing of instructions.

Figure 6:
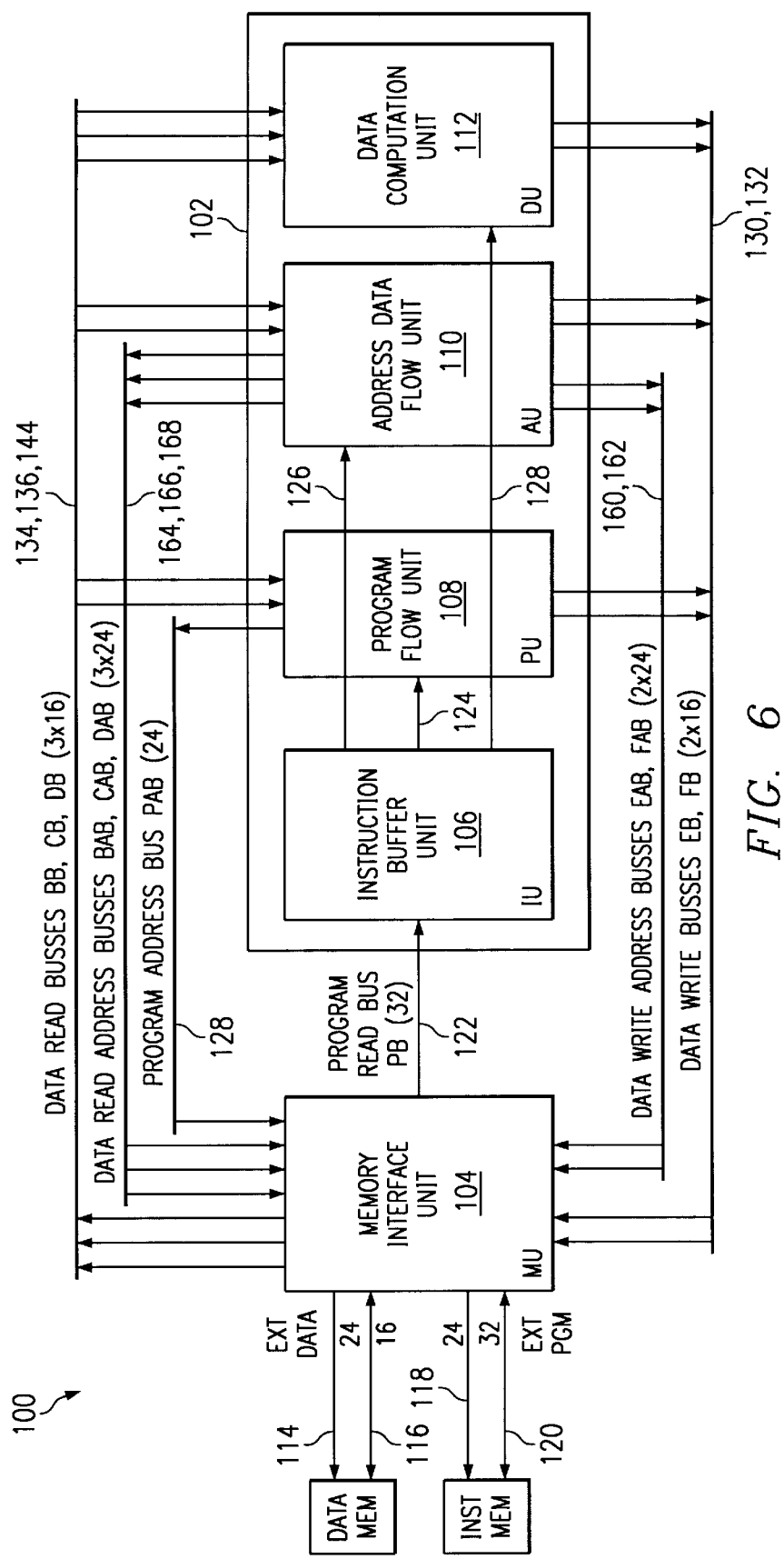
FIG. 6 is a block diagram of the processor illustrating a memory management unit interconnected memory.

As shown in FIG. 6, the present embodiment of the invention includes a memory interface unit 104 which is coupled to external program storage memory 150 via a 24 bit address bus 118 and a 32 bit bi-directional data bus 120. Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 128 respectively.

Figure 7:
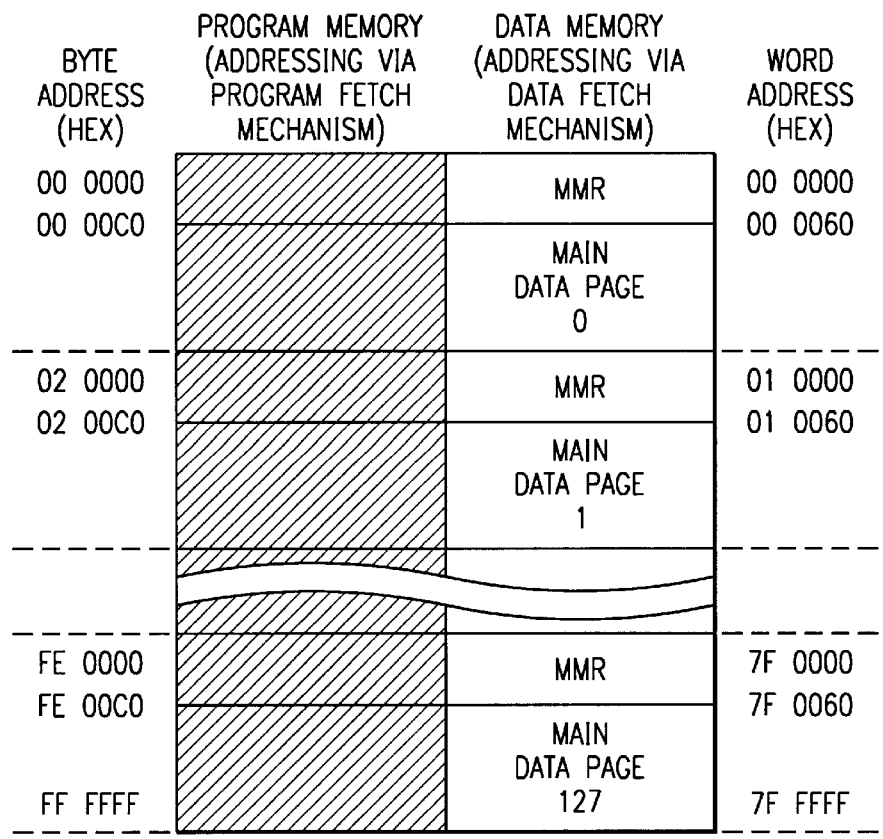
FIG. 7 shows the unified structure of Program and Data memory spaces of the processor.

Processor 100 is organized around a unified program/data space, as illustrated in FIG. 7. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability.

Software can define up to 3 main data pages, as follows:

| MDP | Direct access | Indirect access | CDP |
|---|---|---|---|
| MDP05 | — | Indirect access | AR[0–5] |
| MDP67 | — | Indirect access | AR[6–7] |

A stack is maintained and always resides on main data page 0. CPU memory mapped registers are visible from all the pages.

Various aspects of processor 100 are summarized in Table 2.

processor 100, as described earlier, and a second processor referred to as host processor 810. DSP core 100 performs digital signal processing related tasks, while host processor 810 performs other application tasks. DSP 100 is connected to an internal program memory circuit 801 and to a dual ported communication memory circuit 802 via bus 830. Bridge 803 is also connected to bus 830 and provides access to peripherals 820 and 821 via bus 831. Access is also provided via bus 831 to dedicated hardware 822, which includes various devices and circuits, such as timers, power controls, debugging and emulation circuitry, and such. Interrupt request signals 840 provide interrupt requests from devices 820–822 to DSP 100.

Host processor 810 is connected to host processor interface circuit (HPI) 811 via bus 833. HPI 811 provides buffering and timing control to allow host processor 810 to access communication memory circuit 802 via bus 832. In this manner, host processor 810 can store and access data values in communication memory 802 that can also be stored and accessed by DSP 100. Bus 832 is separate from bus 830 and communication memory 802 is arranged such that host processor 810 can access data values in dual ported memory circuit 802 in a manner that does not impinge on the operation of memory circuit 801. Interrupt request signals 841 provide interrupt requests from host processor 810 to DSP 100.

Host Port Interface 811 has two registers, an interrupt register 812 for asserting interrupt requests and status register 813 for the HPI operational modes. Both registers are accessible by host 810 via bus 833. Interrupt register 812 is operable to assert host interrupt requests to processor 100 in response to a write transaction from host 810. In the present

TABLE 2

Summary of Improved Processor 100

Very Low Power programmable processor
Parallel execution of instructions, 8-bit to 48-bit instruction format
Seven stage pipeline (including pre-fetch)

| | |
|---|---|
| Instruction buffer unit highlight | 32×16 buffer size |
| | Parallel Instruction dispatching |
| | Local Loop |
| Data computation unit highlight | Four 40 bit generic (accumulator) registers |
| | Single cycle 17×17 Multiplication-Accumulation (MAC) |
| | 40 bit ALU, "32 + 8" or "(2 × 16) + 8" |
| | Special processing hardware for Viterbi functions |
| | Barrel shifter |
| Program flow unit highlight | 32 bits/cycle program fetch bandwidth |
| | 24 bit program address |
| | Hardware loop controllers (zero overhead loops) |
| | Interruptible repeat loop function |
| | Bit field test for conditional jump |
| | Reduced overhead for program flow control |
| Data flow unit highlight | Three address generators, with new addressing modes |
| | Three 7 bit main data page registers |
| | Two Index registers |
| | Eight 16 bit pointers |
| | Dedicated 16 bit coefficients pointer |
| | Four 16 bit generic registers |
| | Three independent circular buffers |
| | Pointers & registers swap |
| | 16 bits ALU with shift |
| Memory Interface highlight | Three 16 bit operands per cycle |
| | 32 bit program fetch per cycle |
| | Easy interface with cache memories |

C compiler
Algebraic assembler

Figure 8:
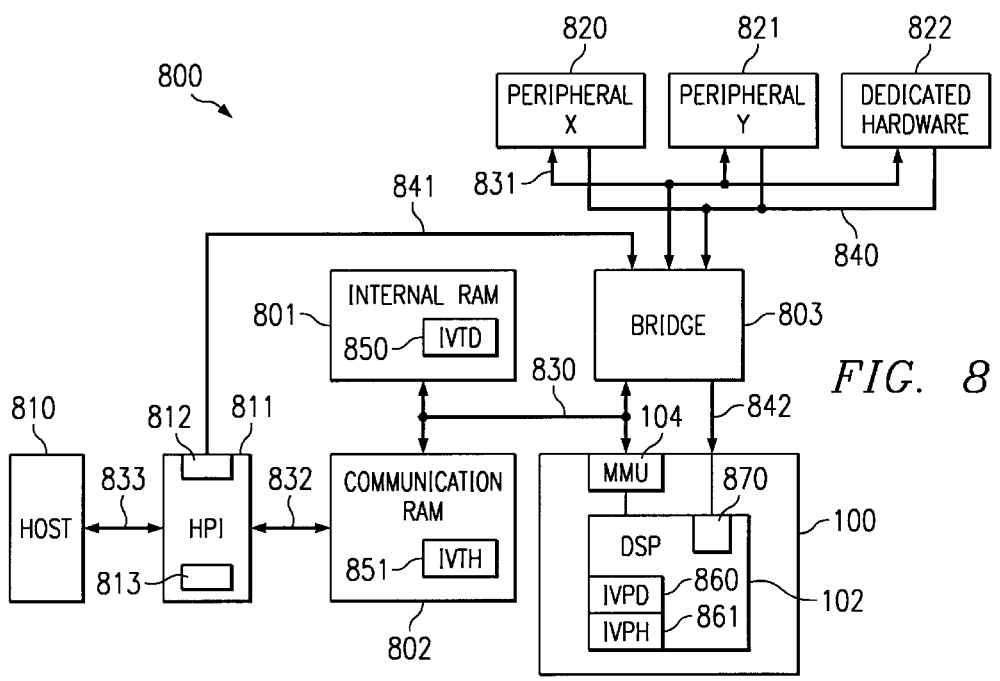
FIG. 8 is a block diagram illustrating an alternative embodiment of a digital system with the processor of FIG. 1, according to aspects of the present invention.

FIG. 8 is a block diagram illustrating an alternative embodiment of a digital system with DSP 100, according to aspects of the present invention. Digital system 800 includes embodiment, eight bits are selected to provide eight host interrupt request signals. An interrupt request pulse will be formed on one or more of the eight host request signals 841 each time the host writes a "1" into the bit associated with each host interrupt request in the interrupt register 812. Another embodiment may have a fewer or a greater number of interrupt request signals associated with a host processor.

A DSP interrupt vector table (IVTD) 850 is maintained in memory circuit 801. IVTD 850 contains a pair of entries for each of interrupt request signals 840. Each pair of entries includes an absolute address of an interrupt service routine to be executed by DSP 100 and an instruction that will be executed as the first instruction of the interrupt service routine. This will be described in more detail later.

According to an aspect of the present invention, a host interrupt vector table (IVTH) 851 is maintained in memory circuit 802. IVTH 851 contains a pair of entries for each of interrupt request signals 841. Each pair of entries includes an absolute address of an interrupt service routine to be executed by DSP 100 and an instruction that will be executed as the first instruction of the interrupt service routine.

DSP 100 has a memory mapped register IVPD 860 for holding a portion of the address in memory circuit 801 of the beginning of IVTD 850 and a memory mapped register IVPH 861 for holding a portion of the address in memory circuit 802 of IVTH 851.

Table 3 lists several memory mapped registers that are that are relevant to an understanding of this embodiment of the present invention. Each of these registers will be described in more detail in the following paragraphs. Processor 100 also has a number of other memory mapped registers that are used for various control, status, and operational tasks.

Two internal interrupt requests (DLOG, RTOS) are assigned to real time emulation for data logging and real time operating system support.

One full cycle is allowed to propagate the interrupt request from the source (user gates, peripheral, synchronous external event, HOST interface) to the interrupt flag within the CPU.

All of the DSP 100 interrupt requests inputs are assumed synchronous with the system clock. The interrupt request pins are edge sensitive. The IFGxx interrupt flag is set upon a high to low pin transition.

An "intr(k5)" instruction provides a software trigger to initiate execution of any interrupt service routine. The instruction operand k5 indicates which interrupt vector location the CPU branches to. When the software interrupt is acknowledged, the global interrupts mask INTM is set to disable maskable interrupts.

A "trap(k5)" instruction performs the same function as the intr(k5) instruction without setting the INTM bit.

A "reset" instruction performs a non-maskable software reset that can be used any time to put the processor in a known state. The reset instruction affects ST0, ST1, ST2, IFR0, and IFR1 but doesn't affect ST3 or the interrupt vectors pointer (IVPD, IVPH). When the reset instruction is acknowledged, the INTM is set to "1" to disable maskable interrupts. All pending interrupts in IFR0,IFR1 are cleared. The initialization of the system control register, the interrupt vectors pointer, and the peripheral registers is different from the initialization done by a hardware reset.

After an interrupt has been requested by hardware or software, DSP 100 must decide whether to acknowledge the

TABLE 3

Memory Mapped Interrupt Registers

| MMR Register | Word Address (Hex) | Register Description | Bit Field |
|---|---|---|---|
| IVPD | 49 | Interrupt vector pointer for DSP 100 | [15-00] |
| IVPH | 4A | Interrupt vector pointer for HOST 810 | [15-00] |
| IFR0 | 01 | Interrupt flag register: INT15–INT00 | [15-00] |
| IMR0 | 00 | Interrupt mask register | [15-00] |
| IFR1 | 46 | Interrupt flag register: INT23–INT 16 | [07-00] |
| IMR1 | 45 | Interrupt mask register | [07-00] |
| ST1 | 07 | Status register | [15-00] |
| ST3 | 37 | System control register | [15-00] |

An interrupt is requested by a hardware device or by a software instruction. When an interrupt request occurs on interrupt request signals 840 or 841, a corresponding IFGxx flag is activated in the interrupt flag register IFR0 or IFR1. This flag is activated whether or not the interrupt is later acknowledged by the processor. The flag is automatically cleared when its corresponding interrupt is taken.

On the processor core 100 boundary, there is no difference between hardware interrupt requests generated from device pins, standard peripheral internal requests, ASIC domain logic requests, HOST CPU requests or internal requests like system errors. Internal interrupt sources like bus error or emulation have their own internal channel. There is no associated request pin at the CPU boundary. The priority of internal interrupts is fixed.

Processor 100 supports a total of 24 interrupt requests lines which are split into a first set of 16 lines 840, usually dedicated to DSP, and a second set of 8 lines 841 which can be either assigned to the DSP or the HOST in a dual processor system. The vector re-mapping of these two sets of interrupts is independent. This scheme allows HOST 810 to define the task number associated to the request by updating the interrupt vector in the communication RAM (API_RAM).

request. Software interrupts and non-maskable interrupts are acknowledged immediately. Maskable hardware interrupts are acknowledged only if the priority is highest, the global interrupts mask INTM in ST1 register is cleared, and the associated interrupt enable bit IENxx in the IMR0 or IMR1 register is set. Each of the maskable interrupts has its own enable bit. Priority arbitration circuitry 870 is connected to receive interrupt requests responsive to signals 840 and 841 after being stored in the IFR0 and IFR1 registers. Priority arbitration circuitry 870 is operable to provide an interrupt number to the microprocessor representative of a highest priority, non-masked interrupt request.

If the CPU acknowledges a maskable hardware interrupt, the program counter (PC) is loaded with the appropriate address and fetches the software vector. During the vector fetch cycle, the CPU generates an acknowledge signal IACK, which clears the appropriate interrupt flag bit. The vector fetch cycle is qualified by the IACK signal and may be used to provide external visibility on interrupts when the vector table resides in internal memory.

The interrupt arbitration is performed on top of the last main program instruction decode pipeline cycle.

Figure 9:
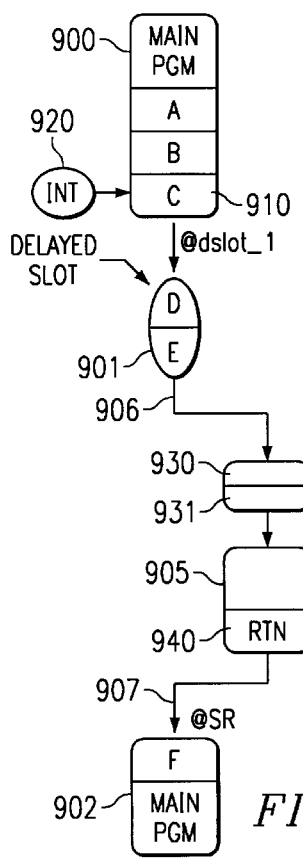
FIG. 9 is a flow diagram illustrating program execution flow during a subroutine call.

FIG. 9 is a flow diagram illustrating program execution flow during an interrupt. An example program is illustrated which includes a sequence of instructions in a first portion 900, one or more instructions in delay slot 901, and a sequence of instructions in a second portion 902. Instructions A, B, and C are representative of the sequence in 900. Interrupt service routine (ISR) 905 is located in a different portion of instruction memory. An interrupt 920 which occurs during execution of instruction 910 results in a transfer of the program flow to ISR 905, as shown at 906. Instructions D and E are executed during delay slot 901.

may be modified in another embodiment. For example, a register or set of registers could be used to define the ranges based on bit settings. Alternatively, a table in a memory, such as memory 801, could be set up to define the ranges.

Each group of vectors may be re-mapped independently simply by changing the value stored in IVPD 860 or IVPH 861 and rewriting the vectors in the respective interrupt vector table. The interrupt priorities of processor 100 and host 810 are interleaved to provide more flexibility to dual processor systems, as illustrated in Table 4.

TABLE 4

| System Priority | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| DSP (1) | 00 | 01 |   | 02 | 03 | 04 | 05 |   | 06 | 07 | 08 |   | 09 | 10 | 11 |   | 12 | 13 |   | 14 | 15 |   |   |   |   |   |   |
| HOST (2) |   |   |   |   |   | 16 |   | 17 |   |   | 18 |   |   |   | 19 |   |   |   | 20 | 21 |   |   | 22 | 23 |   |   |   |
| DEBUG |   |   | 24 |   |   |   |   |   |   |   |   |   |   |   |   |   |   |   |   |   |   |   |   |   |   | 25 | 26 |

After acknowledging the interrupt, processor 100 stores the 24-bit program counter, which is the return address, on the top of the stack in data memory in parallel with a byte of internal variables required to manage the instruction buffer and the program flow. The processor then loads the PC with the address of the interrupt vector 930; calculation of this address will be described later. A 24-bit target address of a potential dgoto/dcall instruction is stored in parallel with the seven most significant bits of the ST0 status register (ACOV3, . . . , ACOV0, C, TC2, TC1) and the single bit delayed slot number. A debug status register DBGSTAT which is physically implemented within an emulation module (not shown) is stored in parallel with the status register ST1. This includes the DBGM, EALLOW and INTM bits as per emulation requirement.

Next, the processor fetches a 24-bit absolute address of the start of ISR 905 from interrupt vector 930 and branches to the interrupt subroutine. An instruction 931 stored immediately after the interrupt vector is executed during the delay slot of the branch to ISR 905. The maximum allowed format of instruction 931 in this embodiment is thirty-two bits. If a direct branch to the ISR is required, then a "NOP" instruction is inserted after interrupt vector 930.

Processor 100 executes ISR 905 until a "return" instruction 940 is encountered. Processor 100 pops from the top of the stack the return address and load it into the PC fetch register WPC 530 (see FIG. 4). Instruction buffer 502 is filled from the return address regardless of fetch advance and aligns PC execute register RPC 534 with WPC 530. Processor 100 then continues executing the main program portion 902.

The interrupt vectors can be re-mapped to the beginning of any 256-byte page in program memory. According to an aspect of the present invention, they are split into two groups in order to provide the capability to define the task associated with the request to the host processor and to keep processor 100 interrupt vectors in non-shared memory 801. A range of interrupts is selected and assigned to processor 100, and identified by IVPD 860. A second range of interrupts is selected and assigned to host processor 810, and identified by IVPH 861. In the present embodiment, the first range includes interrupts 1–15, while the second range includes interrupts 16–23. However, this selection of ranges The interrupt vector address is formed by concatenating three fields which are described in Table 5.

TABLE 5

Interrupt Start/Vector Address Re-Mapping Fields

| Class | Address [23-8] | Address [7-3] | Address [2-0] |
|---|---|---|---|
| INT01 to INT15 | IVPD [23-8] | Interrupt Number | 000 |
| INT16 to INT23 | IVPH [23-8] | Interrupt Number | 000 |
| INT24 to INT26 | IVPD [23-8] | Interrupt Number | 000 |

Emulation interrupt vectors (INT26–INT24) are kept independent from host processor vectors. This insures that during debug there is no risk that the host processor will change the interrupt vectors for an emulation host or a debugger program since these emulation vectors are not mapped into communication RAM 801.

At reset, all the IVPx bits are set to "1." Therefore, the reset vector for hardware reset always resides at location FFFF00h.

Table 6 shows the bit assignments for the interrupt vector pointer for DSP interrupts (IVPD) 860. The IVPD[23-08] field points to the 256-byte program page where the DSP interrupt vector table 850 resides.

TABLE 6

IVPD Register Bit Assignments

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| IVPD23 | IVPD22 | IVPD21 | IVPD20 | IVPD19 | IVPD18 | IVPD17 | IVPD16 | IVPD15 | IVPD14 | IVPD13 | IVPD12 | IVPD11 | IVPD10 | IVPD09 | IVPD08 |

Table 7 shows the bit assignments for the interrupt vector pointer for host interrupts (IVPH) 861. The IVPH[23-08] field points to the 256-byte program page where the host interrupt vector table 851 resides. These vectors are usually re-mapped in the dual port communication RAM 802. The HOST then has the capability to define the task number associated to the request. Keeping DSP vectors separate improves system integrity and may avoid extra cycle latency due to communication RAM arbitration.

Table 9 summarizes the bit assignments of status/control register ST3, while 10 describes the various bits within status/control register ST3.

TABLE 7

IVPH Register Bit Assignments

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| IVPH23 | IVPH22 | IVPH21 | IVPH20 | IVPH19 | IVPH18 | IVPH17 | IVPH16 | IVPH15 | IVPH14 | IVPH13 | IVPH12 | IVPH11 | IVPH10 | IVPH9 | IVPH8 |

Table 8 shows the interrupt/trap number, priority, and location of vectors in interrupt vector tables. In this embodiment, each interrupt vector is stored at the relative address indicated in Table 8 regardless of which interrupt table it is located. An alternative embodiment could use a different scheme for allocating vector address within each interrupt vector table.

TABLE 9

Bit Assignments for ST3

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| CAFRZ | CAAER | CACLR | AVP | MPNMC | | | | | CBERR | XF | HINT | HOMY | HOMX | HOMR | HOMP |

TABLE 8

Interrupt/Trap Number, Priority, and Location

| TRAP/INTR Number (K) | Priority | Hard Interrupt | Soft Interrupt | Location (Hex/bytes) | Function |
|----|----|----|----|----|----|
| 0 | 0 | RESET | SINT0 | 0 | Reset (hardware and software) |
| 1 | 1 | NMI | SINT1 | 8 | Non-maskable interrupt |
| 2 | 3 | INT2 | SINT2 | 10 | Peripheral/User interrupt #2 |
| 3 | 5 | INT3 | SINT3 | 18 | Peripheral/User interrupt #3 |
| 4 | 6 | INT4 | SINT4 | 20 | Peripheral/User interrupt #4 |
| 5 | 7 | INT5 | SINT5 | 28 | Peripheral/User interrupt #5 |
| 6 | 9 | INT6 | SINT6 | 30 | Peripheral/User interrupt #6 |
| 7 | 10 | INT7 | SINT7 | 38 | Peripheral/User interrupt #7 |
| 8 | 11 | INT8 | SINT8 | 40 | Peripheral/User interrupt #8 |
| 9 | 13 | INT9 | SINT9 | 48 | Peripheral/User interrupt #9 |
| 10 | 14 | INT10 | SINT10 | 50 | Peripheral/User interrupt #10 |
| 11 | 15 | INT11 | SINT11 | 58 | Peripheral/User interrupt #11 |
| 12 | 17 | INT12 | SINT12 | 60 | Peripheral/User interrupt #12 |
| 13 | 18 | INT13 | SINT13 | 68 | Peripheral/User interrupt #13 |
| 14 | 21 | INT14 | SINT14 | 70 | Peripheral/User interrupt #14 |
| 15 | 22 | INT15 | SINT15 | 78 | Peripheral/User interrupt #15 |
| 16 | 04 | INT16 | SINT16 | 80 | Host interrupt #16 |
| 17 | 08 | INT17 | SINT17 | 88 | Host interrupt #17 |
| 18 | 12 | INT18 | SINT18 | 90 | Host interrupt #18 |
| 19 | 16 | INT19 | SINT19 | 98 | Host interrupt #19 |
| 20 | 19 | INT20 | SINT20 | A0 | Host interrupt #20 |
| 21 | 20 | INT21 | SINT21 | A8 | Host interrupt #21 |
| 22 | 23 | INT22 | SINT22 | B0 | Host interrupt #22 |
| 23 | 24 | INT23 | SINT23 | B8 | Host interrupt #23 |
| 24 | 2 | INT24 | SINT24 | C0 | Bus error interrupt #24 BERR |
| 25 | 25 | INT25 | SINT25 | C8 | Emulation interrupt #25 DLOG |
| 26 | 26 | INT26 | SINT26 | D0 | Emulation interrupt #26 RTOS |
| 27 | — | — | SINT27 | D8 | Software interrupt #27 |
| 28 | — | — | SINT28 | E0 | Software interrupt #28 |
| 29 | — | — | SINT29 | E8 | Software interrupt #29 |
| 30 | — | — | SINT30 | F0 | Software interrupt #30 |
| 31 | — | — | SINT31 | F8 | Software interrupt #31 |

TABLE 10

Status/Control Register ST3

| | |
|---|---|
| HOMP | Host only access mode to Peripherals |
| HOMP=1 | By setting this bit, DSP 100 requires the peripherals to be owned by host processor 810. This request is exported to the external bus bridge 803 and the operating mode will switch from SAM (shared) to HOM (host only) based on the arbitration protocol (i.e. on going transactions completion . . . ). Bridge 803 returns the state of the active operating mode. DSP 100 can poll the HOMP bit to check the active operating mode. |
| HOMP=0 | By clearing this bit, DSP 100 requires the peripherals to be shared by DSP 100 and host processor 810. This request is exported to bridge 803 and the operating mode will switch from HOM (host only) to SAM (shared) based on the arbitration protocol (i.e. on going transactions completion . . . ). Bridge 503 returns the state of the active operating mode. DSP 100 can poll the HOMP bit to check the active operating mode. HOMP is set at reset. |
| HOMR | Shared access mode to HPI RAM 802 |
| HOMR = 1 | By setting this bit the DSP requires the API RAM to be owned by the host processor. This request is exported to the API module and the operating mode will switch from SAM (shared) to HOM (host only) based on the arbitration protocol (i.e. on going transactions completion . . . ). The API module returns the state of the active operating mode. The DSP can pull the HOMR bit to check the active operating mode. |
| HOMR = 0 | By clearing this bit the DSP requires the API RAM to be shared by the DSP and the host processor. This request is exported to the API module and the operating mode will switch from HOM (host only) to SAM (shared) based on the arbitration protocol (i.e. on-going transactions completion . . . ). The API module returns the state of the active operating mode. The DSP can pull the HOMR bit to check the active operating mode. HOMR is set at reset. |
| HOMX | Host only access mode: This bit is a provision for system support This system control bit is managed through the same scheme as HOMP & HOMR. This a provision for an operating mode control defined external to DSP 100. HOMX is set at reset |
| HOMY | Host only access mode: This bit operates the same as HOMX. |
| HINT | Host interrupt: DSP 100 can set and clear by software the HINT bit in order to send an interrupt request to Host processor 810. The interrupt pulse is managed by software. The request pulse is active low: a software clear / set sequence is required, there is no acknowledge path from the Host in the present embodiment. HINT is set at reset. |
| XF | External Flag: XF is a general purpose external output flag bit which can be manipulated by software and is exported to circuitry external to DSP 100. XF is cleared at reset. |
| CBERR | CPU bus error: CBERR is set when an internal 'bus error' is detected. This error event is then merged with errors tracked in other modules like MMU 104, an external bus, DMA, etc. in order to set the bus error interrupt flag IBERR into the IFR1 register. The interrupt subroutine has to clear the CBERR flag before return to the main program. CBERR is a clear-only flag. The user code can't set the CBERR bit. CBERR is cleared at reset. |
| MP/NMC | Microprocessor / microcomputer mode: MP/NMC enables / disables an on chip ROM (not shown) to be addressable in program memory space. MP/NMC is set to the value corresponding to the logic level on the MP/NMC pin when sampled at reset. This pin is not sampled again until the next reset. The 'reset' instruction doesn't affect this bit. This bit can be also set and cleared by software. |
| MP/NMC=0 | The on chip ROM is enabled and addressable |
| MP/NMC=1 | The on chip ROM is not available. |
| AVIS | Address visibility mode: The AVIS status register bit is exported to a memory management interface (MMI) module (not shown) for external RAM/ROM. AVIS is cleared at reset. |
| AVIS = 0 | The external address lines do not change with the internal program address. Control and data lines are not affected and the address bus is driven with the last address on the bus |
| AVIS = 1 | This mode allows the internal program address to appear at a set of output terminals so that the internal program address can be traced. In case of Cache access on top fetch from internal memory, the internal program bus can be traced. The user can for debug purposes disable by software the Cache from the CAEN bit |
| CACLR | Cache clear |
| CAEN | Cache enable |
| CAFRZ | Cache freeze |
| ST3[10:7] | Unused status register bits |

Figure 10:
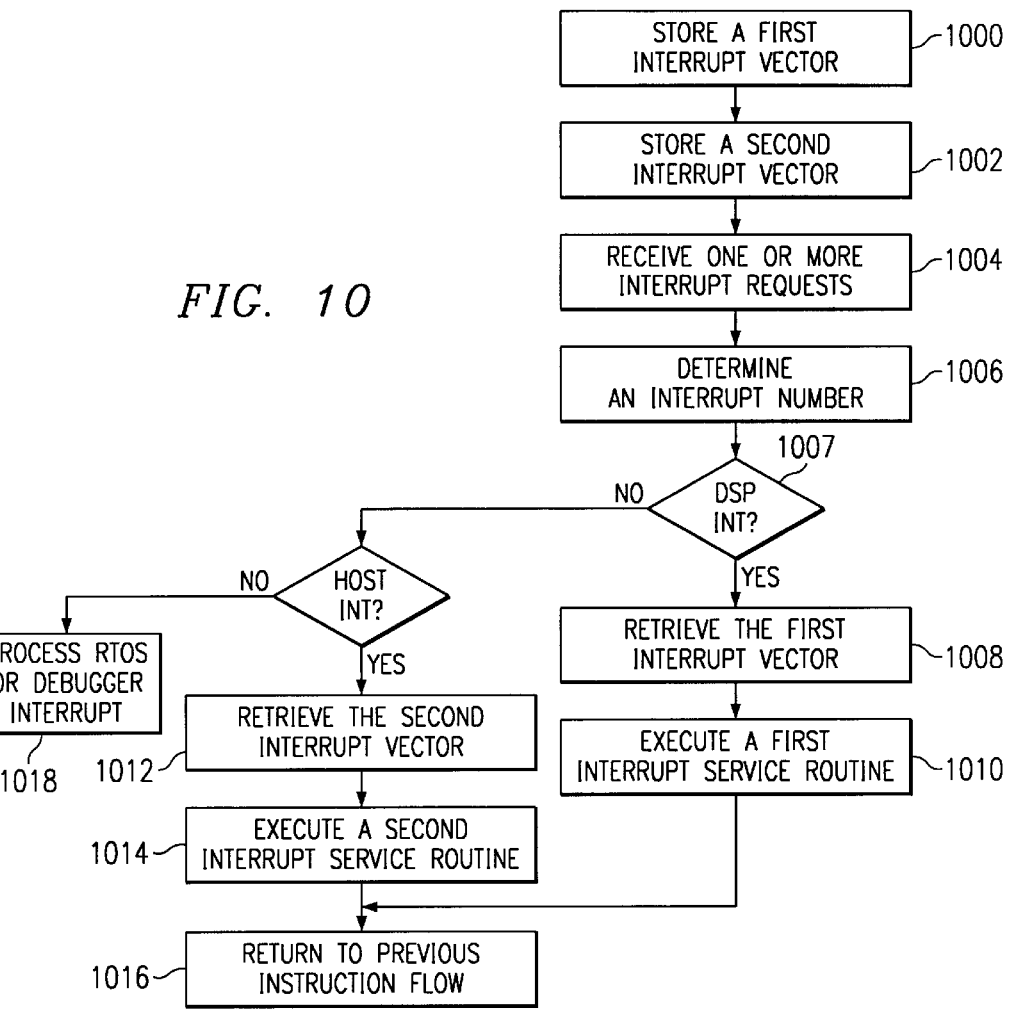
FIG. 10 is a flow chart illustrating the steps of setting up dual interrupt vector tables, according to aspects of the present invention.

FIG. 10 is a flow chart illustrating the steps of setting up dual interrupt vector tables, according to aspects of the present invention. In step 1000, an interrupt vector is stored in interrupt vector table 850 in memory circuit 801. In a memory location immediately following the interrupt vector, an instruction is also stored. This vector is stored in table 850 at an address to coincide with the interrupt it relates to, as described above. This step is repeat as needed for additional interrupt vectors. A value stored in IVPD register 860 points to the first address of IVTD 850. Likewise, in step 1002, an interrupt vector and an instruction is stored in interrupt vector table 851 in memory circuit 802. This vector is stored in table 851 at an address to coincide with the interrupt it relates to, as described above. This step is repeated as needed for additional interrupt vectors. A value stored in IVPH register 861 points to the first address of IVTH 851. According to an aspect of the present invention, interrupt vectors stored in IVTH 851 can be stored by either DSP 100 or by host 810. At step 1004, various interrupt requests are received from various sources via interrupt request signals 840 and 841.

In step 1006, the interrupt number of the highest priority, non-masked interrupt is determined, as described earlier. In step 1007, the interrupt number of the highest priority interrupt is classified as either a DSP interrupt or a HOST interrupt. The interrupt is classified as a DSP interrupt if the interrupt is within a range of interrupt numbers assigned to DSP 100. Alternatively, the interrupt is classified as a host interrupt if the interrupt number is within a range of interrupts assigned to Host 810. In step 1008, DSP 100 retrieves an interrupt vector from IVTD 850 if the interrupt number of the highest priority interrupt is a DSP interrupt, as discussed previously and determined in step 1007. An address for accessing memory circuit 801 is formed by concatenating a value stored in pointer register 860 and the interrupt number. In step 1010, DSP 100 branches to an interrupt service routine pointed to by the interrupt vector that was retrieved in step 1008. As discussed previously, the instruction located immediately after the interrupt vector will be executed during the delay slot in DSP 100 while DSP 100 branches to the interrupt service routine. At the completion of the ISR, DSP 100 will return to the instruction flow from which it was interrupted in step 1016.

If the highest priority interrupt is a HOST interrupt in step 1007, then in step 1012, DSP 100 retrieves an interrupt vector from IVTH 851. Otherwise, a debugger interrupt is handled in step 1018. An address for accessing memory circuit 802 is formed by concatenating a value stored in pointer register 861 and the interrupt number. In step 1014, DSP 100 branches to an interrupt service routine pointed to by the interrupt vector that was retrieved in step 1012. As discussed previously, the instruction located immediately after the interrupt vector will be executed during the delay slot in DSP 100 while DSP 100 branches to the interrupt service routine. At the completion of the ISR, DSP 100 will return to the instruction flow from which it was interrupted in step 1016.

Steps 1008–1010 or 1012–1014 are repeated in response to each interrupt request. According to aspects of the present invention, host 810 can change or update an interrupt vector in IVTH 851 in order to select a different ISR for a given interrupt request without affecting the operation of DSP 100, since host 810 can access RAM 802 in a manner that does not impinge on the operation of memory circuit 801.

Figure 11:
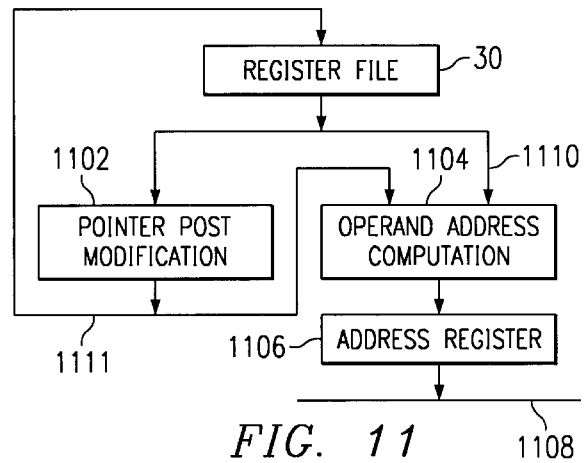
FIG. 11 is a block diagram illustrating address generation in the microprocessor.

FIG. 11 is a block diagram illustrating address generation in DSP 100. Register file 30 holds various registers for microprocessor 100, including IVPD 860 and IVPH 861. Pointer post modification circuitry 1102 is connected to the register file via bus 1110 and is operable to increment or decrement a selected register by a selected amount. A modified register value is provided to operand address computation circuitry 1104 via bus 1111. Operand address computation circuitry 1104 is operable to modify the value of a selected register in response to the addressing mode of an instruction being executed, such as by adding a stack pointer relative address to the stack pointer, as described earlier. An appropriately modified address value is then stored in address register circuitry 1106 and applied to address bus 1108 in order to access memory. Address bus 1108 is representative of any of address busses 160, 162, 164, 166 or 168 of FIG. 6. The A unit supports 16 bit operations and 8 bit load/store. Most of the address computation is performed by the DAGEN thanks to powerful modifiers. All the pointer registers and associated offset registers are implemented as 16 bit registers. The 16 bit address is then concatenated to the main data page to build a 24 bit memory address.

Figure 12:
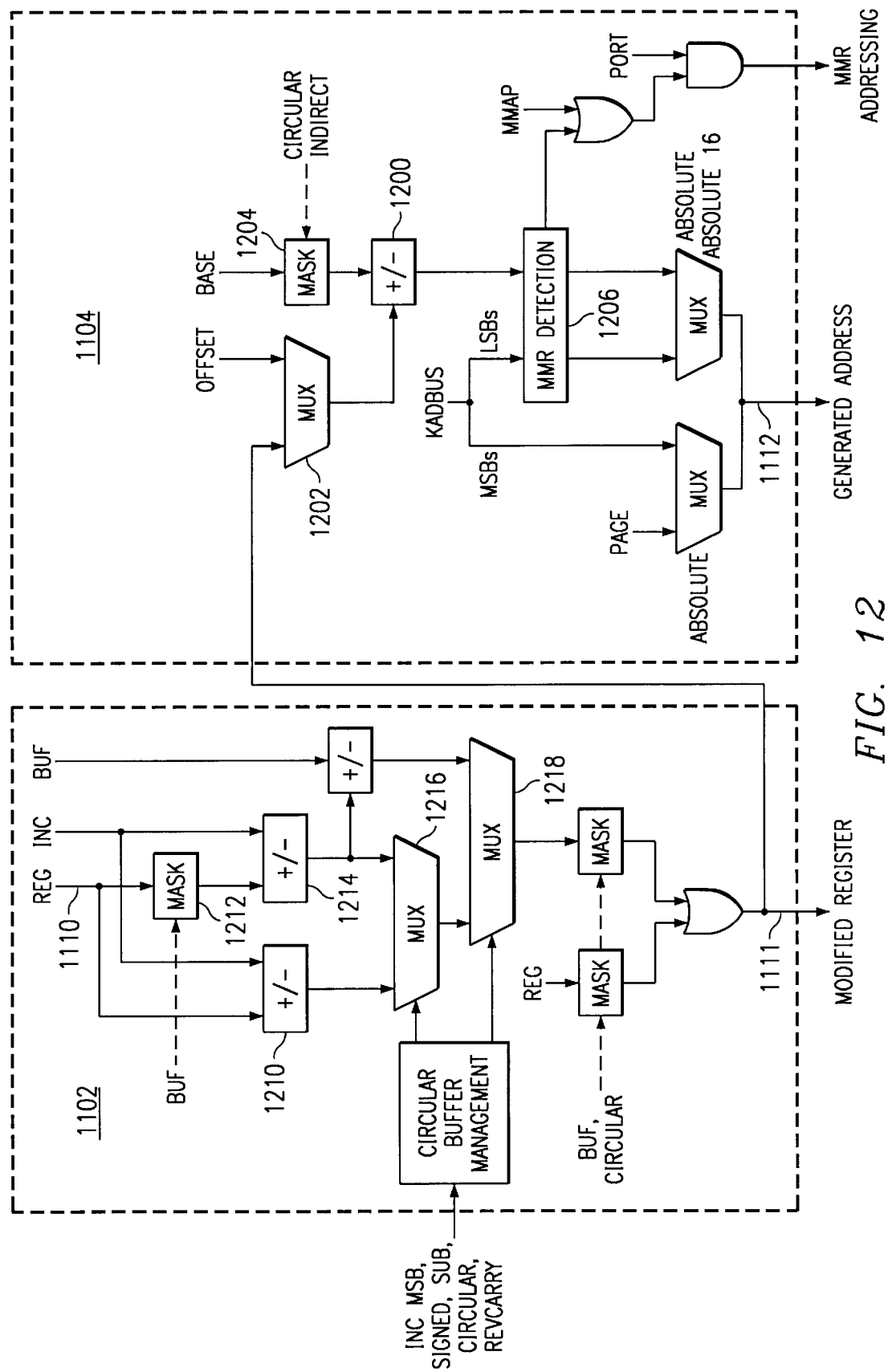
FIG. 12 is a more detailed block diagram of portions of the address generation circuitry.

FIG. 12 is a more detailed block diagram of portions of the address circuitry of FIG. 11. Address generation is made by computing logical and arithmetical operations using masking, additions and subtractions with or without reverse carry propagation. Selection of the operands is done in the Register File. Address generation is performed in two stages: register modification is performed in modification circuitry 1102, and offset computation is performed in computation circuitry 1104. Direct and absolute addressing don't use register modification (in these cases, register modification result is ignored). The address of interrupt vectors in IVTD 850 and IVTH 851 are absolute addresses formed by concatenating the respective interrupt vector pointer register (860, 861) with the interrupt number of the highest priority interrupt.

Register modification is controlled by the signals described in Table 11, while Offset modification is controlled by the signals described in Table 12.

TABLE 11

Register Modification Control Signals

| | |
|---|---|
| sub | modifier requires a post- or pre-decrementation of the register. |
| revcarry | modifier implies a reverse propagated carry operation. |
| circular | register modification should be done circularly. |

TABLE 12

Offset Modification is Control Signals

| | |
|---|---|
| indirect | if LOW, address computation doesn't make use of ARx or modified ARx. |
| absolute24 | address is based on a constant, without use of MDP as a page index. |
| absolute | address is based on a constant, with use of MDP as a page index. |
| pm | address is based on the pre-modified register, computed as described earlier. |
| readport/writeport | address is targeted towards peripherals : offset used is PDP, with no paging. |
| mmap | address is targeted towards MMRs (when in direct addressing, for X and Y paths only) |

X, Y and Coefficient paths are very similar. However, the coefficient path is much simpler, since it only supports indirect addressing with a limited set of modifiers (no pre-modify.

Referring still to FIG. 12, operand address computation circuitry 1104 includes adder/subtractor unit 1200 for pre-incrementing/decrementing a register value. Mux 1202 can provide a modified register value via bus 1111 to a first input of adder 1200. Mux 1202 can also provide an offset value from an instruction to the first input of adder 1200. Masker 1204 is connected to a second input of adder 1200 and can select one of the registers from register file. A computed address is examined to determine if it points to a MMR in detection circuitry 1206, and then sent to an address register via bus 1112.

Still referring to FIG. 12, modification circuitry 1102 receives a register value from register file 30 via bus 1110. The register value can be incremented or decremented by adder/subtractor 1210 or masked by masker circuitry 1212 and then incremented/decremented by adder/subtractor 1214. Multiplexors 1216 and 1218 route the modified value to bus 1111 for updating the register file 30 and for sending to address computation circuitry 1104.

Figure 13:
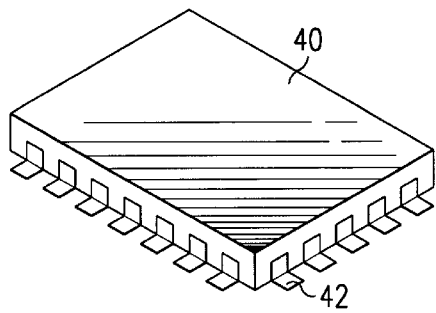
FIG. 13 is a schematic representation of an integrated circuit incorporating the processor.

FIG. 13 is a schematic representation of an integrated circuit incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 14:
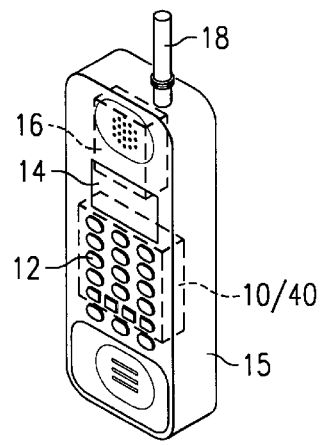
FIG. 14 is a schematic representation of a telecommunications device incorporating the processor of FIG. 1.

FIG. 14 illustrates an exemplary implementation of an example of such an integrated circuit in a mobile telecommunications device, such as a mobile telephone with integrated keyboard 12 and display 14. As shown in FIG. 14, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. Instructions can be executed in a parallel manner, either in response to implicit parallelism or in response to user defined parallelism. Interrupt vectors are split into two groups (HOST & DSP) and the capability to re-map independently the DSP interrupt vectors and the HOST interrupt vectors is provided. The HOST vectors are stored in the dual ported communication RAM in order to be loaded from the HOST processor. The DSP interrupt vectors reside in internal single access DSP RAM. In order to provide flexibility on interrupt management, the HOST and DSP interrupt channels priorities are interleaved. This allows, for instance, a specific HOST interrupt channel with a higher priority than a DSP interrupt, while still having a set of HOST interrupts with lower priority than the DSP interrupt channels.

Advantageously, system integrity is improved since the host can manipulate interrupt vectors without affecting the operation of the DSP. Software debugging is simplified by isolating the host and DSP interrupt operations. Interrupt latency is improved by allowing DSP interrupt vectors to be in non-shared memory which can be accessed more quickly than a memory circuit shared with the host processor. Locating the host interrupt vector table in dual ported communication memory 802 makes good usage of this resource.

Another embodiment may have more than two interrupt vector tables. The different interrupt vector tables can be located in the same memory circuit in different or contiguous address spaces, or in different memory circuits. The interrupt priorities may be assigned in a different order.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a microprocessor, wherein the microprocessor is operable to respond to an interrupt request from a plurality of sources, wherein the microprocessor comprises:

means for receiving a plurality of interrupt requests from the plurality of sources;

means for selecting a first interrupt vector from a first memory circuit in response to a first interrupt request from a first source selected from the plurality of sources;

means for selecting a second interrupt vector from a second memory circuit in response to a second interrupt request from a second source selected from the plurality of sources; wherein the second memory circuit is distinct from the first memory circuit; and means for executing a first interrupt service routine from a plurality of interrupt service routines in response to the first interrupt vector and a second interrupt service routine from the plurality of interrupt service routines in response to the second interrupt vector.

2. The digital system of claim 1, further comprising:

a first memory circuit connected to the microprocessor operable to store a value for the first interrupt vector;

a second memory circuit connected to the microprocessor operable to store a value for the second interrupt vector; and a host processor interface connected to the second memory circuit, wherein the host processor interface is operable to provide the second interrupt request.

3. The digital system according to claim 2, further comprising a host processor connected to the host processor interface, wherein the host processor interface is operable to cause a different value to be stored in the second memory for the second interrupt vector in response to a first signal from the host processor, and wherein the host processor interface is operable to provide the second interrupt request in response to a second signal from the host processor.

4. The digital system according to claim 1, wherein:

the means for receiving a plurality of interrupt requests comprises priority arbitration circuitry connected to receive the plurality of interrupt requests, the priority arbitration circuitry operable to provide an interrupt number to the microprocessor representative of a highest priority interrupt request of the plurality of interrupt requests;

the means for selecting a first interrupt vector comprises a first pointer register connected to the microprocessor, the first pointer register operable to hold a portion of an address of the first interrupt vector;

the means for selecting a second interrupt vector comprises a second pointer register connected to the microprocessor, the second pointer register operable to hold a portion of an address of the second interrupt vector; and the means for executing a first interrupt service routine comprises address circuitry connected to the first pointer, to the second pointer, and to the priority arbitration circuitry, the address circuitry operable to form an address for accessing the first memory circuit by combining the value of the first pointer and the interrupt number if the value of the interrupt number is within a first range, the address circuitry further operable to form an address for accessing the second memory circuit by combining the value of the second pointer and the interrupt number if the value of the interrupt number is within a second range.

5. The digital system according to claim 1 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

6. A method of operating a digital system comprising a microprocessor, wherein the microprocessor is operable to respond to an interrupt request from a plurality of sources, comprising the steps of:

storing a first interrupt vector in a first memory circuit; storing a second interrupt vector in a second memory circuit;

receiving a plurality of interrupt requests from the plurality of sources;

determining an interrupt number of a highest priority interrupt request of the plurality of interrupt requests;

retrieving the first interrupt vector from the first memory circuit in response to a first interrupt request from a first source of the plurality of sources when the first interrupt request is the highest priority interrupt;

executing a first interrupt service routine from a plurality of interrupt service routines in response to the first interrupt vector;

retrieving the second interrupt vector from the second memory circuit in response to a second interrupt request from a second source of the plurality of sources when the second interrupt request is the highest priority interrupt; wherein the second memory circuit is distinct from the first memory circuit; and executing a second interrupt service routine from the plurality of interrupt service routines in response to the second interrupt vector.

7. The method of claim 6, wherein:

the step of retrieving a first interrupt vector comprises forming an address for accessing the first memory circuit by combining a value stored in a first pointer register and the interrupt number if the value of the interrupt number is within a first range, and the step of retrieving a second interrupt vector comprises forming an address for accessing the second memory circuit by combining a value stored in a second pointer register and the interrupt number if the value of the interrupt number is within a second range.

8. The method according to claim 6, wherein the first range and the second range are determined by accessing a range table stored in a third memory circuit.

9. The method according to claim 6, wherein the second source is a host processor; and wherein the step of storing a second interrupt vector comprises storing the second interrupt vector in the second memory circuit in response to memory transaction initiated by the host processor.

10. The method according to claim 9, wherein the step of storing a second interrupt vector further comprises storing the second interrupt vector in the second memory circuit in a manner that does not impinge on the operation of the first memory circuit.

11. The method according to claim 7, wherein:

the first range and the second range are determined by accessing a range table stored in a third memory circuit, and the second source is a host processor; and wherein the step of storing a second interrupt vector comprises storing the second interrupt vector in the second memory circuit in response to memory transaction initiated by the host processor.

12. The method according to claim 11, wherein the step of storing a second interrupt vector further comprises storing the second interrupt vector in the second memory circuit in a manner that does not impinge on the operation of the first memory circuit.

13. A digital system comprising a microprocessor, wherein the microprocessor is operable to respond to an interrupt request from any of a plurality of sources, wherein the microprocessor comprises:

priority arbitration circuitry connected to receive a plurality of interrupt requests from the plurality of sources, the priority arbitration circuitry operable to provide an interrupt number to the microprocessor representative of a highest priority interrupt request of the plurality of interrupt requests;

a first pointer register connected to the microprocessor, the first pointer register operable to hold a portion of an address of a first interrupt vector table;

a second pointer register connected to the microprocessor, the second pointer register operable to hold a portion of an address of a second interrupt vector table; and wherein the microprocessor is operable to select an interrupt vector in response to the highest priority interrupt request by using the first pointer if the highest priority interrupt is from a first portion of the plurality of interrupt requests and by using the second pointer if the highest priority interrupt is from a second portion of the plurality of interrupt requests.

14. The digital system of claim 13, further comprising:

a first memory circuit connected to the microprocessor operable to store the first interrupt vector table; and a second memory circuit connected to the microprocessor operable to store the second interrupt vector table.

15. The digital system of claim 14, wherein the first memory circuit operates in a manner that is independent of the second memory circuit.

16. The digital system of claim 13, wherein the plurality of interrupt requests are identified by an ordered sequence of interrupt numbers and wherein the first portion of the plurality of interrupt requests corresponds to a first range of interrupt numbers and the second portion of the plurality of interrupt requests corresponds to a second range of interrupt numbers.

17. The digital system of claim 16, wherein the first range and the second range are determined by accessing a range table stored in a third memory circuit connected to the microprocessor.

18. The digital system of claim 16, wherein the priority arbitration circuitry is operable to rank the plurality of interrupt requests in an order of priority in an intermingled manner such that the order of priority does not correspond to the order of the sequence of interrupt numbers.

* * * * *